United States Patent [19]

Bussey

[11] 4,434,824
[45] Mar. 6, 1984

[54] ROUTER GUIDE

[76] Inventor: Patrick D. Bussey, R.R. 2, Fremont, Nebr. 68025

[21] Appl. No.: 369,147

[22] Filed: Apr. 16, 1982

[51] Int. Cl.³ .............................................. B27C 5/10
[52] U.S. Cl. ........................... 144/134 D; 144/136 C;
83/574; 248/660; 409/178
[58] Field of Search ............... 144/1 F, 134 R, 134 D,
144/136 R, 136 C; 83/574; 409/178, 181;
248/656, 657, 669, 660

[56] References Cited

U.S. PATENT DOCUMENTS

| 434,011 | 8/1890 | Wrigley | 248/656 |
| 4,132,254 | 1/1979 | Shockousky | 144/136 C |
| 4,355,557 | 10/1982 | Mecsey | 83/574 |

FOREIGN PATENT DOCUMENTS

| 252465 | of 1912 | Fed. Rep. of Germany | 248/669 |
| 1296236 | of 1962 | France | 248/656 |

Primary Examiner—Francis S. Husar
Assistant Examiner—Jorji M. Griffin
Attorney, Agent, or Firm—Zarley, McKee, Thomte, Voorhees & Sease

[57] ABSTRACT

A router guide for a router comprising first and second spaced-apart end supports adapted to be removably positioned on spaced-apart supporting surfaces. First and second support members are secured to and extend between the ends of the first and second supports and have an elongated router track slidably mounted thereon and extending therebetween. The router track comprises elongated spaced-apart angle members adapted to receive and support the router base. The angle members are spaced-apart to define an elongated opening extending therebetween adapted to receive the power shaft of the router extending downwardly therethrough. The support members are selectively vertically and horizontally mounted on the end supports. The router track may be selectively moved between the end supports and the router may be selectively moved between the ends of the router track to level a large slab of wood.

1 Claim, 5 Drawing Figures

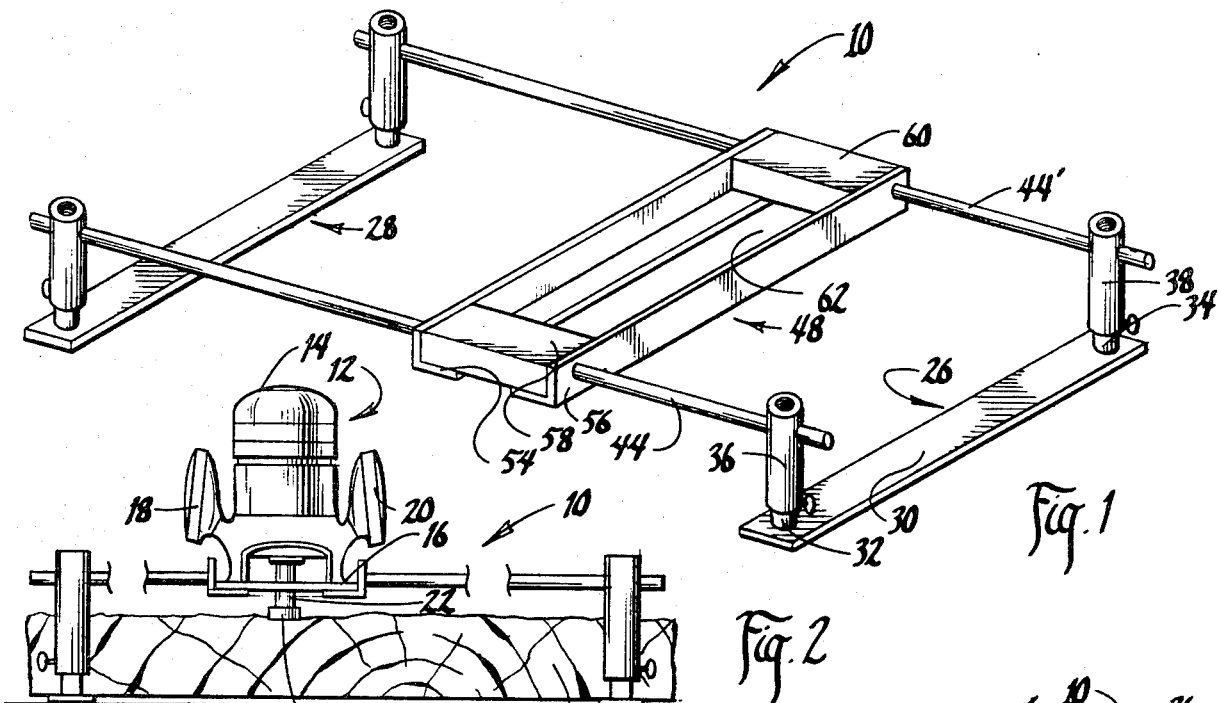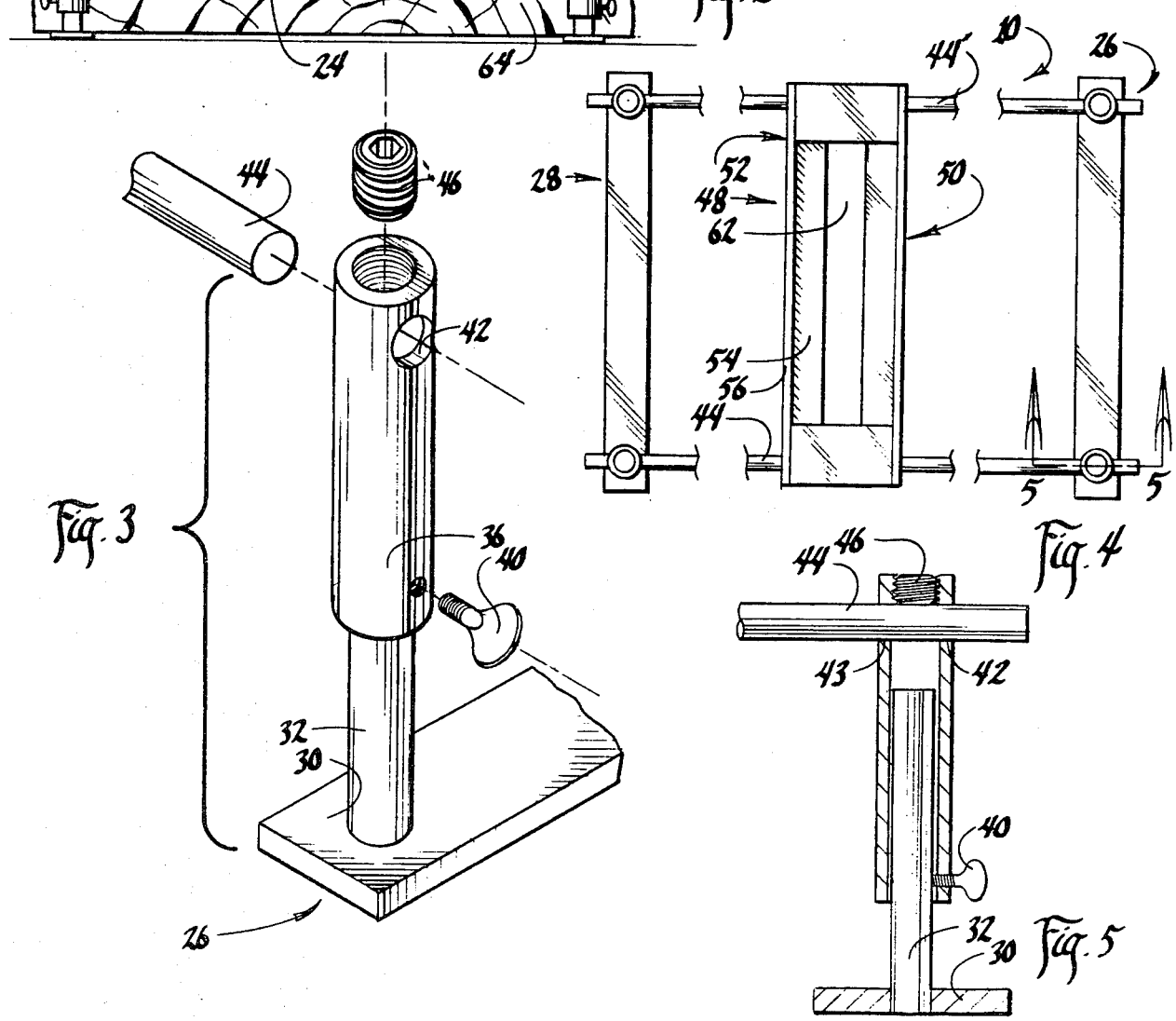

ROUTER GUIDE

BACKGROUND OF THE INVENTION

This invention relates to a router guide and more particularly to a portable router guide which may be used to level a large slab of wood such as a tree trunk or the like.

In the manufacture of tree slab tables and tree clocks, it is necessary that a large piece of wood such as a tree trunk or the like be planed or flattened on two sides. It is possible to level the piece of wood with an extremely large planar but such a piece of equipment is not commonly available to those working in this particular type of art. A router is a relatively inexpensive piece of equipment and normally includes a top portion positioned above a flat base portion with a power shaft extending downwardly from the base portion. Different types of router bits are normally attached to the power shaft. The router could be used to level the piece of wood if some means can be provided to not only support the router but to support the router in a fashion such that it can level the large piece of wood from one end to the other.

Therefore, it is a principal object of this invention to provide a router guide.

A still further object of the invention is to provide a router guide for supporting a router to enable the router to be used to level a large piece of wood.

A further object of the invention is to provide a router guide, the opposite ends of which may be supported by any convenient supporting surface such as tables, benches, etc.

Still another object of the invention is to provide a router guide including an elongated router track which is slidably mounted between end supports and wherein the router may be moved longitudinally on the router track.

Still another object of the invention is to provide a router guide for use with a router to enable the router to level a large piece of wood which is not only easy to use but which is economical of manufacture.

These and other objects will be apparent to those skilled in the art.

BRIEF DESCRIPTION OF THE DRAWINGS

FIG. 1 is a perspective view of the router guide;

FIG. 2 is a side view of the router guide of this invention having a router mounted thereon with portions of the router guide being cut away to more fully illustrate the invention;

FIG. 3 is an exploded perspective view of the means for supporting one end of one of the support members;

FIG. 4 is a partial top plan view of the router guide; and

FIG. 5 is an enlarged sectional view taken on lines 5—5 of FIG. 4.

SUMMARY OF THE INVENTION

The router guide of this invention comprises spaced-apart first and second supports which are adapted to be placed on supporting surfaces such as a floor, benches, tables, etc. Each of the end supports comprises a flat base portion having a pair of upstanding posts at the opposite ends thereof. Support members are selectively vertically and horizontally mounted on the upstanding posts and extend between the end supports. A router track is slidably mounted on the supports and extends therebetween. The router track is adapted to receive and support the base of the router and has an elongated opening provided therein to permit the power shaft of the router to extend downwardly therethrough so that the router may be moved between the ends of the router track as the router track is moved between the end supports.

DESCRIPTION OF THE PREFERRED EMBODIMENT

The router guide of this invention is referred to generally by the reference numeral 10 and is designed to be used in conjunction with a conventional router referred to by the reference numeral 12. Router 12 includes an upper end 14, base 16 and a pair of handles 18 and 20. Power shaft 22 extends downwardly through or below base 16 and is adapted to have a conventional router bit 24 mounted thereon.

Router guide 10 comprises elongated end supports 26 and 28 which are identical. Inasmuch as end supports 26 and 28 are identical, only end support 26 will be described in detail. End support 26 includes a flat base portion 30 having a pair of upstanding posts 32 and 34 provided at the opposite ends thereof. Sleeves 36 and 38 are selectively vertically mounted on the posts 32 and 34 respectively by means of thumb screws 40 as best illustrated in FIG. 5.

Each of the sleeves 36 and 38 is provided with openings 42 and 43 formed in the upper end thereof adapted to receive one end of an elongated support member 44. As seen in FIG. 5, support member 44 is selectively longitudinally held in position on the sleeve 36 by means of Allen screw 46 threadably mounted in the upper end of sleeve 36.

As seen in the drawings, support members 44 and 44' extend between the end supports 26 and 28. Router track 48 is slidably mounted on the elongated support members 44 and 44' and is adapted to support the router 12 as best illustrated in FIG. 2. Router track 48 comprises spaced-apart angle members 50 and 52 each of which comprise horizontal portions 54 and vertical portions 56. As seen in the drawings, the vertical portions of the angle members 50 and 52 are provided with openings at their opposite ends which slidably receive the support members 44 and 44' to enable the router track to be moved along the lengths of the support members 44 and 44' as desired. Spacer blocks 58 and 60 are provided at the ends of the router track and also slidably receive the support members 44 and 44'. As best illustrated in FIGS. 1 and 2, the inner edges of the horizontal portions of the angle members 50 and 52 are spaced-apart to provide an elongated opening 62 which is adapted to receive the power shaft 22 of router 12 extending downwardly therethrough. As best seen in FIG. 2, the vertical portions 56 of the angle members 50 and 52 are sufficiently spaced-apart to enable the base 16 of router 12 to be received therebetween so that the base 16 may rest and slide upon the horizontal portions of the angle members 50 and 52.

It should be noted that the end supports 26 and 28 and the lengths of the support members 44 and 44' may be of any particular dimension depending upon the size of the piece of wood being leveled. When it is desired to level a piece of wood 64, the piece of wood may be placed on a supporting surface such as a floor or the like. The router guide 10 is then positioned over the piece of wood so that the router track 48 extends over the upper portion thereof and so that the end supports 26 and 28 are positioned on opposite sides of the wood. If the wood has a large diameter, the base portions 30 of the end supports 26 and 28 may be supported on any convenient supporting surface such as sawhorses, benches, tables, etc. Since the pieces of wood normally have uneven or irregular thicknesses, the support members 44 and 44' may be leveled with respect to the wood by simply raising and lowering the collars on the posts on the opposite ends of the end supports. Further, the support members 44 and 44' may be longitudinally adjusted with respect to the end supports 26 and 28 corresponding to the particular size of the wood being leveled.

Once the router guide 10 has been properly positioned, the router 12 is then positioned on the router track so that the base 16 of router 12 is received by and supported on the angle members 50 and 52 with the power shaft 22 extending downwardly through the opening 62 so that the bit 24 can engage the upper surface of the wood. The router track 48 would normally be positioned adjacent one of the end supports with the router 12 normally being positioned at one end of the router track. The router is then activated so that the bit 24 will engage the upper portion of the wood to chip or remove the upper portion thereof. With the router track 48 adjacent one of the end supports, the router 12 is moved slowly along the length of the router track 48 until it reaches the other end. The router track is then moved longitudinally on the support members 44 and 44' at a distance corresponding to the width of the bit 24. The router is then moved the length of the router track 48. This procedure is repeated until the router has passed back and forth on the router guide 48 between the end supports 26 and 28.

When one side of the wood has been leveled, the wood would be rotated 180° to enable the other side of the wood to be leveled. Thus it can be seen that a novel router guide has been provided which is portable in nature and which may be easily positioned with respect to a large piece of wood to enable an inexpensive router to be used to level opposite of the wood. The router guide may be easily supported on opposite sides of the wood and may be easily adjusted to insure that the wood will be properly leveled. Thus it can be seen that the router guide of this invention accomplishes at least all of its stated objectives.

I claim:
1. A router guide for a router including a flat base portion having a power shaft extending downwardly therefrom, comprising, first and second spaced-apart elongated supports adapted to be removably positioned on spaced-apart supporting surfaces, said supports having opposite ends, each of said supports having upstanding posts at the opposite ends thereof, a collar selectively vertically adjustably mounted on each of said posts and having horizontally disposed openings formed therein adjacent the upper ends thereof, a first elongated support member having its opposite ends selectively longitudinally adjustably received in the openings in the collars at one end of said first support and one end of said second support and extending therebetween, a second elongated support member having its opposite ends selectively longitudinally adjustably received in the openings in the collars at the other end of said first support and the other end of said second support and extending therebetween, means for removably maintaining said support members in said collars, an elongated router track slidably mounted on said first and second support members and extending therebetween whereby said track may be selectively moved between said first and second supports, said outer track comprising elongated spaced-apart angle members having a horizontal portion and a vertical portion, said horizontal portions of said angle members being spaced from each other to define an elongated opening therebetween adapted to receive the router power shaft extending downwardly therethrough, said vertical portions of said angle members being spaced apart approximately the width of the router base to limit lateral movement of the router with respect to the router track, said angle members adapted to receive and support the router base thereon whereby the router may be slidably supported thereon for movement between the ends thereof.

* * * * *